US012345391B2

(12) United States Patent
Saarnio

(10) Patent No.: US 12,345,391 B2
(45) Date of Patent: Jul. 1, 2025

(54) OPTICAL DEVICE WITH TWO OPTICAL ELEMENTS FOR MODIFYING LIGHT DISTRIBUTION

(71) Applicant: LEDIL OY, Salo (FI)

(72) Inventor: Olli Saarnio, Salo (FI)

(73) Assignee: LEDIL OY, Salo (FI)

( * ) Notice: Subject to any disclaimer, the term of this patent is extended or adjusted under 35 U.S.C. 154(b) by 0 days.

(21) Appl. No.: 18/572,713

(22) PCT Filed: Jun. 6, 2022

(86) PCT No.: PCT/FI2022/050391
§ 371 (c)(1),
(2) Date: Dec. 20, 2023

(87) PCT Pub. No.: WO2023/012400
PCT Pub. Date: Feb. 9, 2023

(65) Prior Publication Data
US 2024/0288149 A1 Aug. 29, 2024

(30) Foreign Application Priority Data
Aug. 2, 2021 (FI) ..................................... 20215832

(51) Int. Cl.
*F21V 14/06* (2006.01)
*F21V 5/00* (2018.01)
(Continued)

(52) U.S. Cl.
CPC .............. *F21V 14/06* (2013.01); *F21V 5/008* (2013.01); *F21V 5/045* (2013.01); *F21V 7/0091* (2013.01); *F21Y 2115/10* (2016.08)

(58) Field of Classification Search
CPC ......... F21V 5/008; F21V 7/0091; F21V 14/06
See application file for complete search history.

(56) References Cited

U.S. PATENT DOCUMENTS 2,712,060 A 6/1955 Johnson
3,020,396 A * 2/1962 Worboys ................ F21L 4/005
D26/49

(Continued)

FOREIGN PATENT DOCUMENTS

GB 2474921 A 5/2011
WO WO-2006072885 A1 * 7/2006 ............. F21L 4/027

(Continued)

OTHER PUBLICATIONS

Finnish Search Report for FI 20215832, dated Feb. 11, 2022, 2 pages.

(Continued)

*Primary Examiner* — Tracie Y Green
*Assistant Examiner* — Michael Chiang
(74) *Attorney, Agent, or Firm* — NIXON & VANDERHYE

(57) ABSTRACT

An optical device includes a first optical element and a second optical element moveable with respect to the first optical element. The first optical element includes a first surface for modifying a distribution of light exiting the first optical element, and the second optical element includes a second surface facing towards the first surface and for further modifying the distribution of the light. One of the first and second surfaces includes convex areas whereas the other one of these surfaces includes concave areas. An optical effect of the optical device is changeable by moving the second optical element with respect to the first optical element in a direction parallel with the first surface. The first and second surfaces are shaped to have stepwise shape discontinuities to reduce a spatial room needed between the first and second surfaces.

20 Claims, 10 Drawing Sheets

(51) Int. Cl.

| | |
|---|---|
| ***F21V 5/04*** | (2006.01) |
| ***F21V 7/00*** | (2006.01) |
| *F21Y 115/10* | (2016.01) |

(56) References Cited

U.S. PATENT DOCUMENTS

| | | | | | |
|---|---|---|---|---|---|
| 3,484,599 | A * | 12/1969 | Little | G02B 3/005 362/268 |
| 3,827,798 | A | 8/1974 | Alvarez | |
| 3,860,812 | A * | 1/1975 | Schneider | G03B 15/0442 362/355 |
| 4,316,241 | A * | 2/1982 | Gulliksen | F21V 14/06 362/325 |
| 4,345,303 | A * | 8/1982 | Gerard | F21S 41/635 362/279 |
| 5,775,799 | A | 7/1998 | Forkner | |
| 6,115,181 | A * | 9/2000 | Kelly | G02B 27/123 359/618 |
| 10,901,227 | B2 * | 1/2021 | Jesurun | G02B 27/0927 |
| 2003/0007359 | A1 | 1/2003 | Sugawara et al. | |
| 2016/0116723 | A1 * | 4/2016 | Hukkanen | G02B 19/0061 249/117 |
| 2022/0252238 | A1 * | 8/2022 | Yoshida | G02B 3/08 |

FOREIGN PATENT DOCUMENTS

| | | | |
|---|---|---|---|
| WO | 2014184422 | A1 | 11/2014 |
| WO | 2016181905 | A1 | 11/2016 |
| WO | 2020208292 | A1 | 10/2020 |

OTHER PUBLICATIONS

International Search Report for PCT/FI2022/050391, mailed Sep. 28, 2022, 4 pages.

Written Opinion of the ISA for PCT/FI2022/050391, mailed Sep. 28, 2022, 10 pages.

* cited by examiner

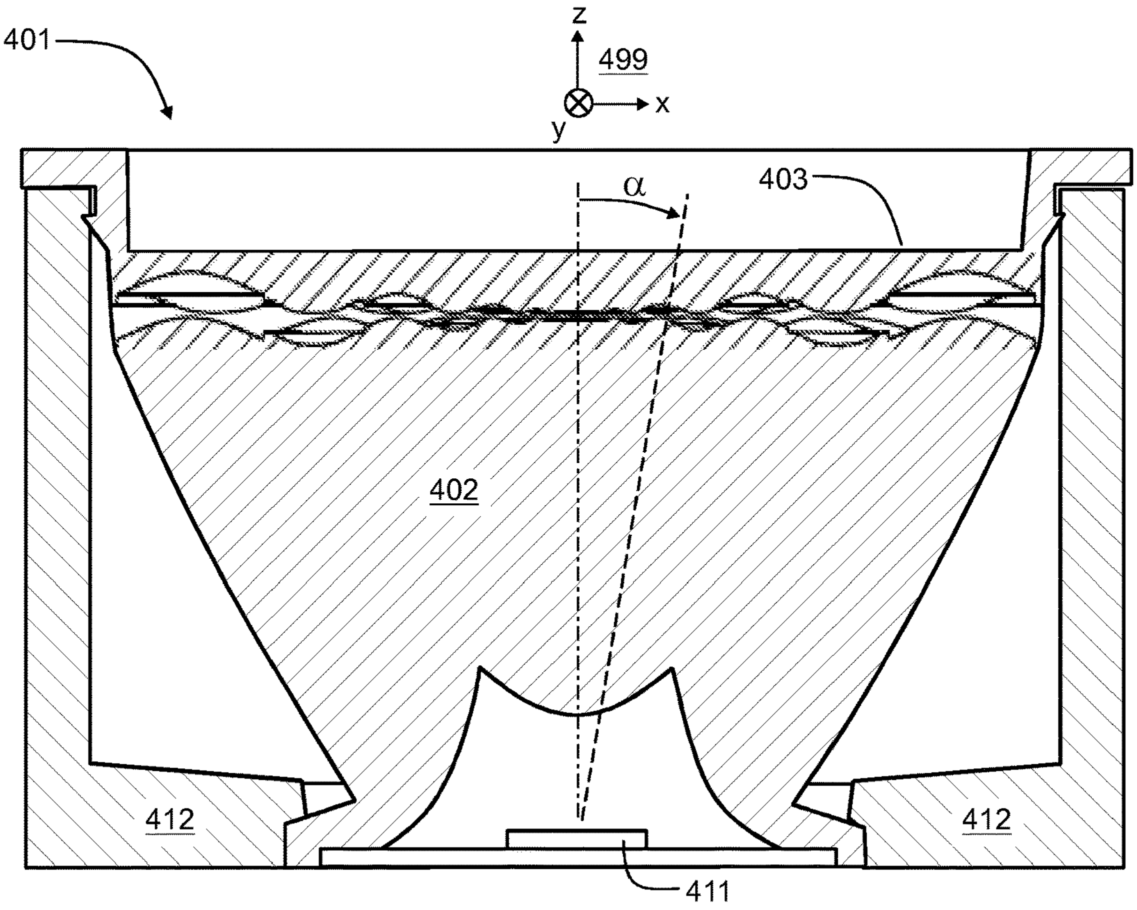
Figure 4a
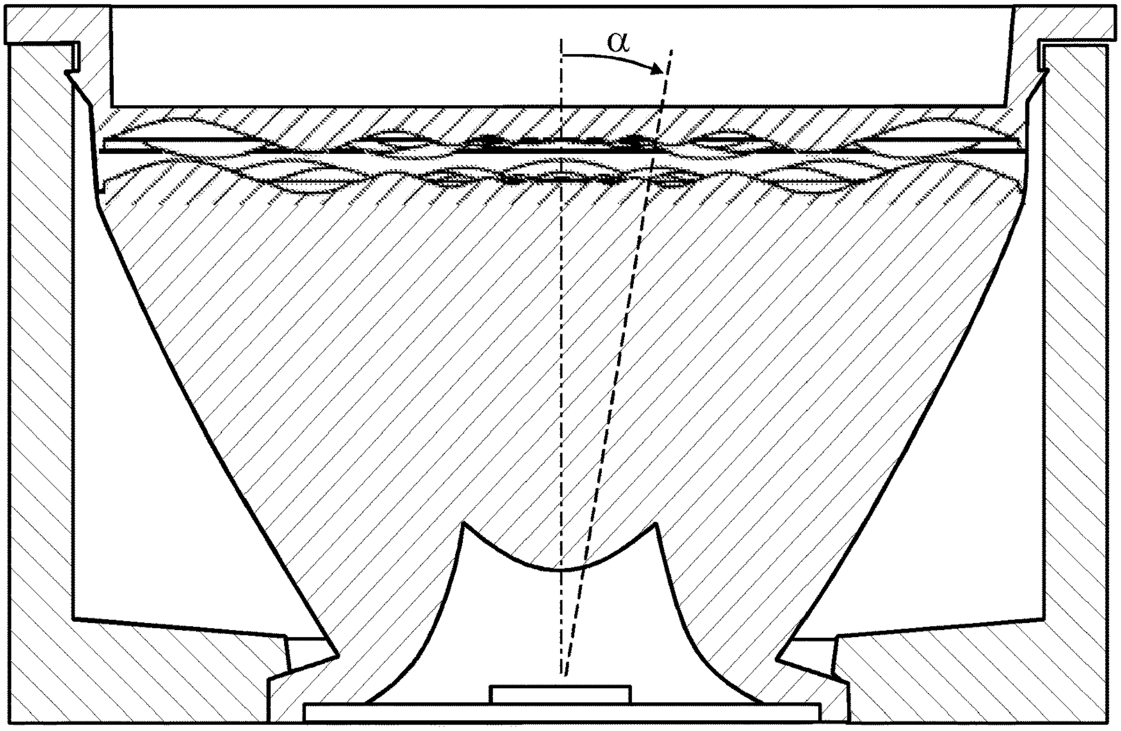
Figure 4b, prior art

OPTICAL DEVICE WITH TWO OPTICAL ELEMENTS FOR MODIFYING LIGHT DISTRIBUTION

CROSS-REFERENCE TO RELATED APPLICATIONS

This application is the U.S. national phase of International Application No. PCT/FI2022/050391 filed Jun. 6, 2022, which designated the U.S. and claims priority to FI 20215832 filed Aug. 2, 2021, the entire contents of each of which are hereby incorporated by reference.

FIELD OF THE DISCLOSURE

The disclosure relates generally to illumination engineering. More particularly, the disclosure relates to an optical device for modifying a distribution of light produced by a light source that can be, for example but not necessarily, a light emitting diode "LED".

BACKGROUND

A distribution of light produced by a light source can be important or even critical in some applications. The light source can be, for example but not necessarily, a light emitting diode "LED", a filament lamp, or a gas-discharge lamp. The distribution of light produced by a light source can be modified with optical devices such as lenses, reflectors, and combined lens-reflector devices that comprise sections which act as lenses and sections which act as reflectors. In many cases there is a need for an optical device that is adjustable for tuning a shape of a light distribution pattern produced by a light source and the optical device. For example, there can be a need to change a width of a light distribution pattern smoothly between a narrow light distribution pattern for illuminating a spot and a wider light distribution pattern for illuminating a larger area.

Publication WO2006072885 describes an optical device for adjusting a shape of a light distribution pattern. The optical device of WO2006072885 comprises a first optical element and a second optical element for modifying a distribution of light produced by a light source. The first and second optical elements are successively in a pathway of the light so that the second optical element receives the light exiting the first optical element. The optical device of WO2006072885 comprises an adjustment mechanism for adjusting the distance between the first and second optical elements along the optical axis of the optical device and thereby for varying the shape of the light distribution pattern. An inconvenience related to the optical device of WO2006072885 is the need for the adjustment mechanism for adjusting the distance between the first and second optical elements along the optical axis of the optical device. A further inconvenience related to the optical device of WO2006072885 is that the physical length of the optical device is changing when the shape of the light distribution pattern is changed. The changing physical length is an unwanted property in conjunction with many illumination applications e.g. in cases where optical devices are embedded in ceiling or wall structures so that a front surface of each optical device is substantially in flush with a wall or ceiling surface.

Publication U.S. Pat. No. 5,775,799 describes an optical device for adjusting a shape of a light distribution pattern. The optical device of U.S. Pat. No. 5,775,799 comprises a first optical element and a second optical element for modifying a distribution of light produced by a light source. The first and second optical elements are successively in a pathway of the light so that the second optical element receives the light exiting the first optical element. The first optical element comprises a first surface for modifying a distribution of light exiting the first optical element, and the second optical element comprises a second surface facing towards the first surface and for further modifying the distribution of the light. Each of the first and second surfaces comprises convex areas and concave areas. An optical effect of the optical device of U.S. Pat. No. 5,775,799 is changeable by moving the second optical element with respect to the first optical element in a direction parallel with the first and second surfaces. In a first position, the concave areas of the second surface are aligned with the convex areas of the first surface and correspondingly the convex areas of the second surface are aligned with the concave areas of the first surface. In a second position, the concave areas of the second surface are aligned with the concave areas of the first surface and correspondingly the convex areas of the second surface are aligned with the convex areas of the first surface. In the first position, an optical effect of the second surface at least partly compensates for an optical effect of the first surface, whereas in the second position a compensating effect of the kind mentioned above does not take place. The optical device of U.S. Pat. No. 5,775,799 does not need a mechanism for adjusting a distance between the first and second optical elements along the optical axis of the optical device. On the other hand, depending on highest convex areas on the above-mentioned first and second surfaces, there can be a need for significant distances between other optically functional areas of the first and second optical surfaces in the direction along the optical axis to allow the first and second optical elements to move with respect to each other in a direction parallel with the first and second surfaces. The above-mentioned distances may need to be so long that the corresponding optically functional areas of the first and second optical surfaces may not work in an optimal way.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new optical device for modifying a distribution of light produced by a light source.

An optical device according to the invention comprises:

- a first optical element comprising a first surface for modifying a distribution of light exiting the first optical element through the first surface, and
- a second optical element comprising a second surface facing towards the first surface in a first direction and for further modifying the distribution of the light entering the second optical element through the second surface.

The above-mentioned second optical element is moveably supported with respect to the above-mentioned first optical element so that the second surface is movable with respect to the first surface in a direction parallel with the first surface. The first surface and/or the second surface comprises convex areas and correspondingly the second surface and/or the first surface comprise concave areas for at least partly compensating for an optical effect of the convex areas when the second optical element is in a first position with respect to the first optical element so that the convex areas and the concave areas are aligned with respect to each other. A combined optical effect of the first and second surfaces is changeable by moving the second optical element from the above-mentioned first position towards a second position in which the concave areas and the convex areas are non-aligned with respect to each other.

At least one of the above-mentioned first and second surfaces is shaped to have stepwise shape discontinuities configured to reduce a spatial room between the first and second surfaces in at least one position of the second optical element with respect to the first optical element. Advantageously, the stepwise shape discontinuities are configured to reduce the spatial room when the second optical element is in the above-mentioned first position with respect to the first optical element so that a distance from at least one of the convex areas to one of the concave areas that is aligned with the at least one of the convex areas is reduced by the stepwise shape discontinuities. The fact that the at least one convex area can be closer to the respective concave area facilitates achieving desired optical properties.

The above-mentioned second optical element can be movable with respect to the above-mentioned first optical element for example so that the second optical element is rotatable with respect to the first optical element around a geometric optical axis of the optical device or so that the second optical element is linearly movable with respect to the first optical element. Therefore, a shape of a light distribution pattern can be varied without changing the distance between the first and second optical elements, i.e. without changing the physical length of the optical device.

In accordance with the invention, there is provided also a new illumination device that comprises:

a light source, and an optical device according to the invention for modifying a distribution of light emitted by the light source.

The light source may comprise for example one or more light emitting diodes "LED".

In accordance with the invention, there is provided also a new mold set that comprises:

a first mold having a form suitable for manufacturing, by mold casting, a first piece of transparent material constituting the first optical element of an optical device according to the invention, and a second mold having a form suitable for manufacturing, by mold casting, a second piece of transparent material constituting the second optical element of the optical device according to the invention.

Exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying embodiments when read in conjunction with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

Exemplifying and non-limiting embodiments and their advantages are explained in greater detail below with reference to the accompanying drawings, in which:

FIG. 4*a* illustrates an illumination device comprising an optical device according to an exemplifying and non-limiting embodiment and FIG. 4*b* illustrates an illumination device comprising an optical device according to the prior art.

DESCRIPTION OF EXEMPLIFYING AND NON-LIMITING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1A:
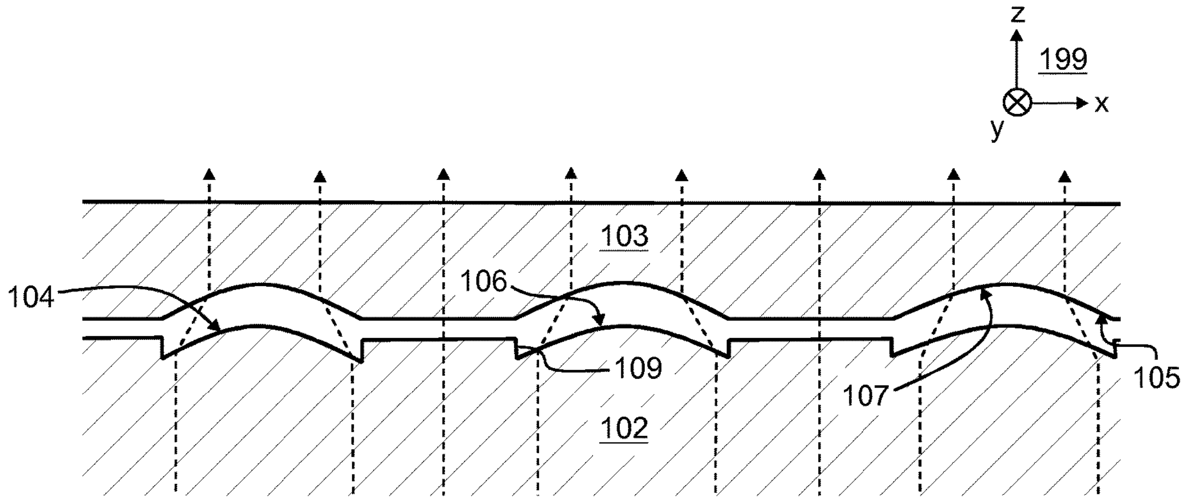
FIGS. 1*a* and 1*b* illustrate details of an optical device according to an exemplifying and non-limiting embodiment.
Figure 1B:
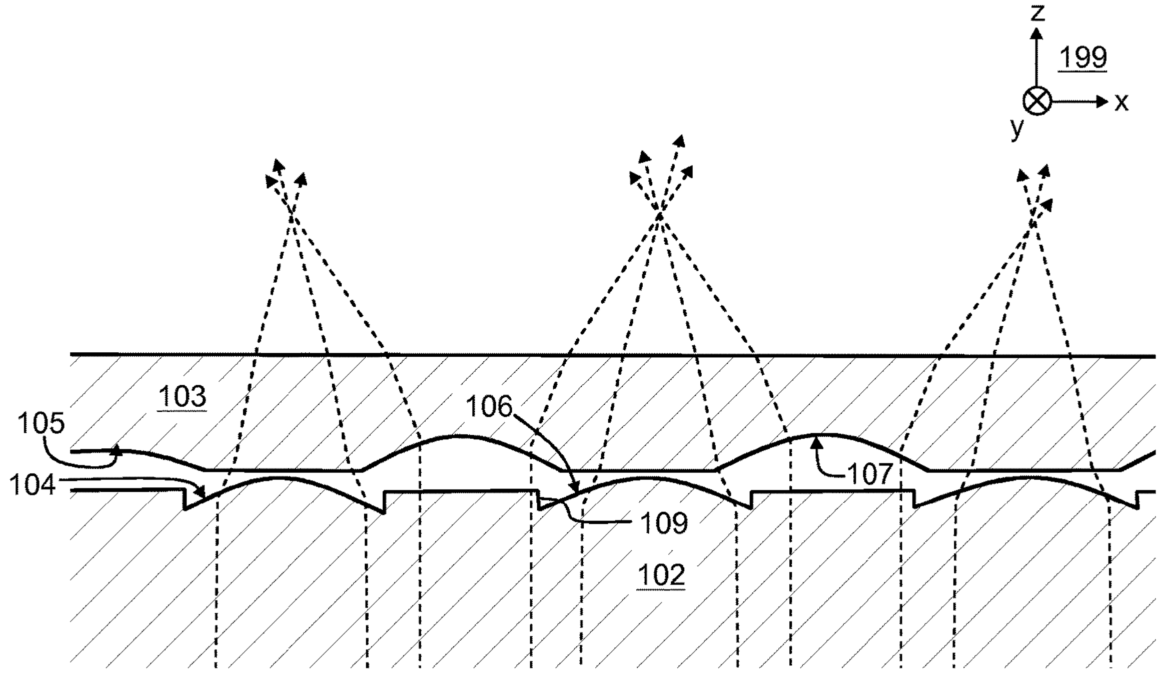

FIGS. 1*a* and 1*b* illustrate details and a principle of operation of an optical device according to an exemplifying and non-limiting embodiment. FIGS. 1*a* and 1*b* show section views where a geometric section plane is parallel with the xz-plane of a coordinate system 199. The optical device comprises a first optical element 102 that comprises a first surface 104 for modifying a distribution of light exiting the first optical element 102 through the first surface 104. The optical device comprises a second optical element 103 that comprises a second surface 105 facing towards the first surface 104 of the first optical element 102. The second surface 105 is suitable for further modifying the distribution of the light that has exited the first optical element 102. In FIGS. 1*a* and 1*b*, exemplifying light beams are depicted with dashed line arrows. The second optical element 103 is moveably supported with respect to the first optical element 102 so that the second surface 105 is movable with respect to the first surface 104 in a direction parallel with the first surface 104. In the exemplifying optical device illustrated in FIGS. 1*a* and 1*b*, the second optical element 103 is moveable with respect to the first optical element 102 in the positive and negative x-directions of the coordinate system 199. In this exemplifying optical device, the first surface 104 comprises convex areas and the second surface 105 comprises concave areas. In FIGS. 1*a* and 1*b*, one of the convex areas of the first surface 104 is denoted with a reference 106 and one of the concave areas of the second surface 105 is denoted with a reference 107. It is however also possible that the second surface 105 comprises convex areas and the first surface 104 comprises concave areas. As shown in FIG. 1*a*, the concave areas of the second surface 105 compensate at least partly for an optical effect of the convex areas of the first surface 104 when the second optical element 103 is in a first position with respect to the first optical element 102 so that the concave areas of the second surface 105 are aligned with the convex areas of the first surface 104. A combined optical effect of the first and second surfaces 104 and 105 is changeable by moving the second optical element 103 with respect to the first optical element 102 in the positive or negative x-direction of the coordinate system 199. FIG. 1*b* shows an exemplifying situation in which the second optical element 103 is in a second position with respect to the first optical element 102 so that the concave areas of the second surface 105 are not aligned with the convex areas of the first surface 104. As illustrated in FIG. 1*b*, the optical device spreads the originally collimated light.

In the exemplifying optical device illustrated in FIGS. 1*a* and 1*b*, the first surface 104 is shaped to have stepwise shape discontinuities configured to reduce a spatial room between the first and second surfaces 104 and 105. In FIGS. 1*a* and 1*b*, one of the stepwise shape discontinuities is denoted with a reference 109. The stepwise discontinuations comprise walls parallel with the direction in which the second surface 105 is facing towards the first surface 104 i.e. parallel with the z-axis of the coordinate system 199. As illustrated in FIGS. 1*a* and 1*b*, the stepwise shape discontinuities make it possible to bring the first and second optical elements 102 and 103 closer to each other.

Figure 2A:
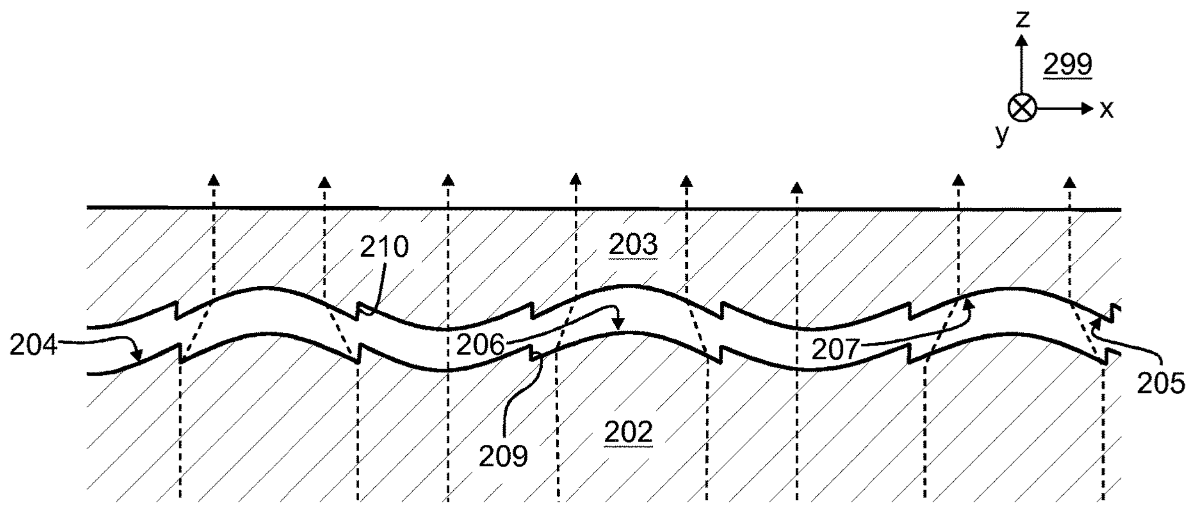
FIGS. 2*a* and 2*b* illustrate details of an optical device according to an exemplifying and non-limiting embodiment.
Figure 2B:
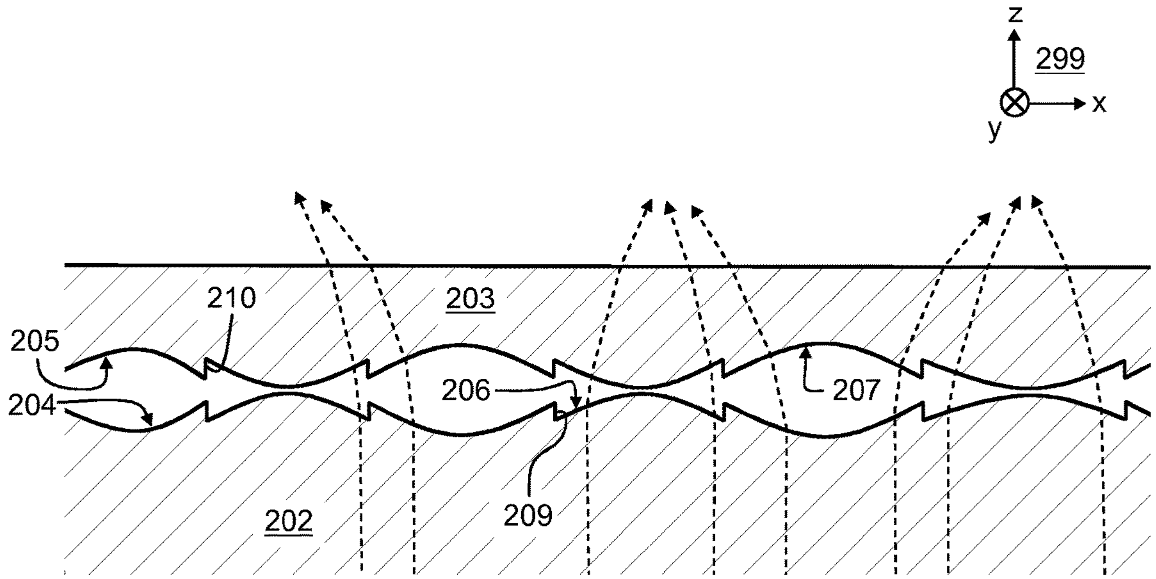

FIGS. 2*a* and 2*b* illustrate details of an optical device according to another exemplifying and non-limiting embodiment. FIGS. 2*a* and 2*b* show section views where a geometric section plane is parallel with the xz-plane of a coordinate system 299. The optical device comprises a first optical element 202 that comprises a first surface 204 for modifying a distribution of light exiting the first optical element 202 through the first surface 204. The optical device comprises a second optical element 203 that comprises a second surface 205 facing towards the first surface 204 of the first optical element 202. The second surface 205 is suitable for further modifying the distribution of the light that has exited the first optical element 202. In FIGS. 2*a* and 2*b*, exemplifying light beams are depicted with dashed line arrows. The second optical element 203 is moveably supported with respect to the first optical element 202 so that the second surface 205 is movable with respect to the first surface 204 in a direction parallel with the first surface 204. In the exemplifying case illustrated in FIGS. 2*a* and 2*b*, the second optical element 203 is moveable with respect to the first optical element 202 in the positive and negative x-directions of the coordinate system 299. In this exemplifying optical device, the first surface 204 comprises convex areas and concave areas between the convex areas. Correspondingly, the second surface 205 comprises convex areas and concave areas between the convex areas. In FIGS. 2*a* and 2*b*, one of the convex areas of the first surface 204 is denoted with a reference 206 and one of the concave areas of the second surface 205 is denoted with a reference 207. As shown in FIG. 2*a*, the concave areas of the second surface 205 compensate at least partly for an optical effect of the convex areas of the first surface 204 and correspondingly the convex areas of the second surface 205 compensate at least partly for an optical effect of the concave areas of the first surface 204 when the second optical element 203 is in a first position with respect to the first optical element 202 so that the concave areas of the second surface 205 are aligned with the convex areas of the first surface 204. A combined optical effect of the first and second surfaces 204 and 205 is changeable by moving the second optical element 203 with respect to the first optical element 202 in the positive or negative x-direction of the coordinate system 299. FIG. 2*b* shows an exemplifying situation in which the second optical element 203 is in a second position with respect to the first optical element 202 so that the concave areas of the second surface 205 and the convex areas of the first surface 204 are not aligned with respect to each other. As illustrated in FIG. 2*b*, the optical device spreads the originally collimated light.

In the exemplifying optical device illustrated in FIGS. 2*a* and 2*b*, the first and second surfaces 204 and 205 are shaped to have stepwise shape discontinuities which reduce a spatial room between the first and second surfaces 204 and 205 when the second optical element 203 is in the position shown in FIG. 2*b*. In FIGS. 2*a* and 2*b*, one of the stepwise shape discontinuities of the first surface 204 is denoted with a reference 209 and one of the stepwise shape discontinuities of the second surface 205 is denoted with a reference 210. The stepwise discontinuations comprise walls parallel with the direction in which the second surface 205 is facing towards the first surface 204, i.e. parallel with the z-axis of the coordinate system 299. As illustrated in FIGS. 2*a* and 2*b*, the stepwise shape discontinuities make it possible to bring the first and second optical elements 202 and 203 closer to each other.

Figure 2C:
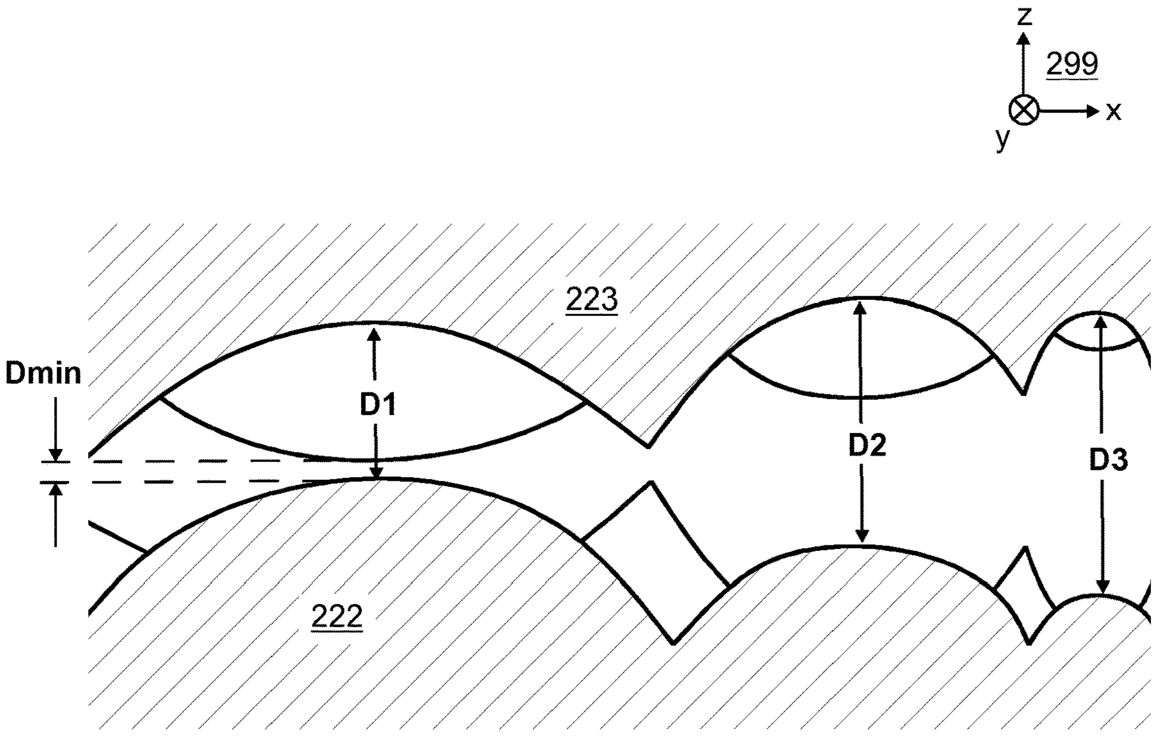
Figure 2c Prior art
FIGS. 2*c* and 2*d* illustrate a difference between an optical device according to the prior art and an optical device according to an exemplifying and non-limiting embodiment.
Figure 2D:
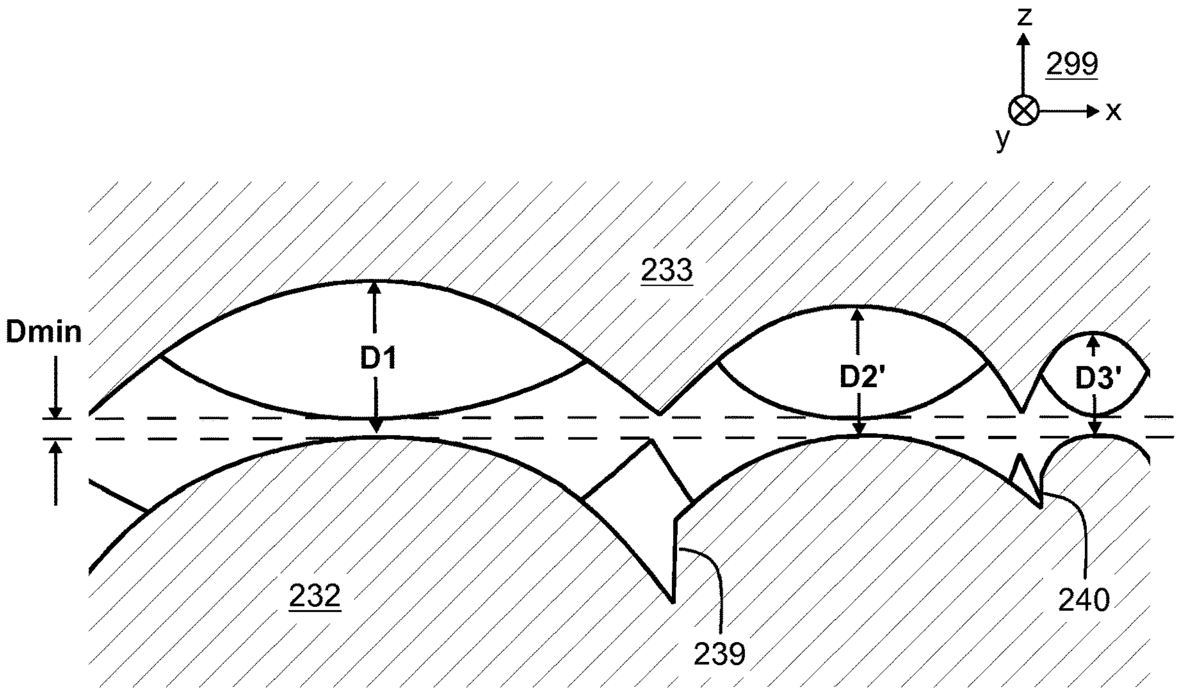

FIGS. 2*c* and 2*d* illustrate a difference between an optical device according to the prior art and an optical device according to an exemplifying and non-limiting embodiment. FIG. 2*c* illustrates a detail of an optical device according to the prior art, and FIG. 2*d* illustrates a detail an optical device according to an exemplifying and non-limiting embodiment. FIGS. 2*c* and 2*d* show section views where a geometric section plane is parallel with the xz-plane of a coordinate system 299. The optical device illustrated in FIG. 2*c* comprises a first optical element 222 and a second optical element 223 so that the second optical element 223 is moveable in a direction parallel with the y-axis of the coordinate system 299 with respect to the first optical element 222. Correspondingly, the optical device illustrated in FIG. 2*d* comprises a first optical element 232 and a second optical element 233 so that the second optical element 233 is moveable in a direction parallel with the y-axis of the coordinate system 299 with respect to the first optical element 232.

In the optical device illustrated in FIG. 2*c*, the minimum of a distance from the first optical element 222 to the second optical element 223 on a movement range of the second optical device 223 is Dmin. In FIG. 2*c*, a distance D1 between a first convex area and a first concave area is so short with respect to sizes of the first convex area and the first concave area that these convex and concave areas can compensate for their optical effects in a reasonable extent. A distance D2 between a second convex area and a second concave area is so long with respect to sizes of the second convex area and the second concave area that it is questionable whether these convex and concave areas can sufficiently compensate for their optical effects. A distance D3 between a third convex area and a third concave area is so long with respect to sizes of the third convex area and the third concave area that these convex and concave areas cannot sufficiently compensate for their optical effects.

In the exemplifying optical device illustrated in FIG. 2*d*, stepwise shape discontinuities are configured to adapt the minimum distance from the top of each convex area to an opposite one of the first and second optical elements to be the same Dmin for each of the convex areas on a movement range of the second optical element 233. In FIG. 2*d*, two of the stepwise shape discontinuities are denoted with references 239 and 240. In the optical device illustrated in FIG. 2*d*, distances D2' and D3' are shorter with respect to sizes of the corresponding convex and concave areas than the corresponding distances D2 and D3 in the optical device illustrated in FIG. 2*c*. Therefore, these convex and concave areas of the optical device illustrated in FIG. 2*d* can compensate for their optical effects better than the corresponding convex and concave areas in the optical device illustrated in FIG. 2*c*.

Figure 3A:
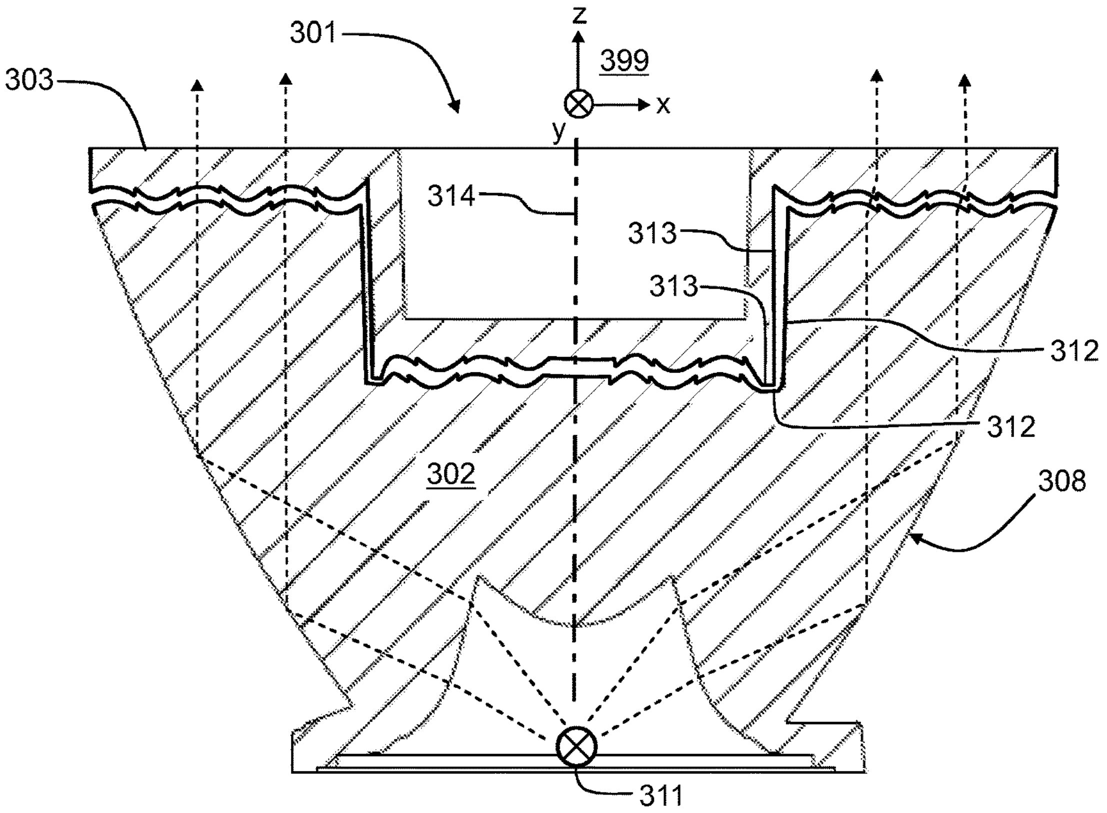
FIGS. 3*a*, 3*b*, 3*c*, 3*d*, 3*e*, and 3*f* illustrate an optical device according to an exemplifying and non-limiting embodiment.
Figure 3B:
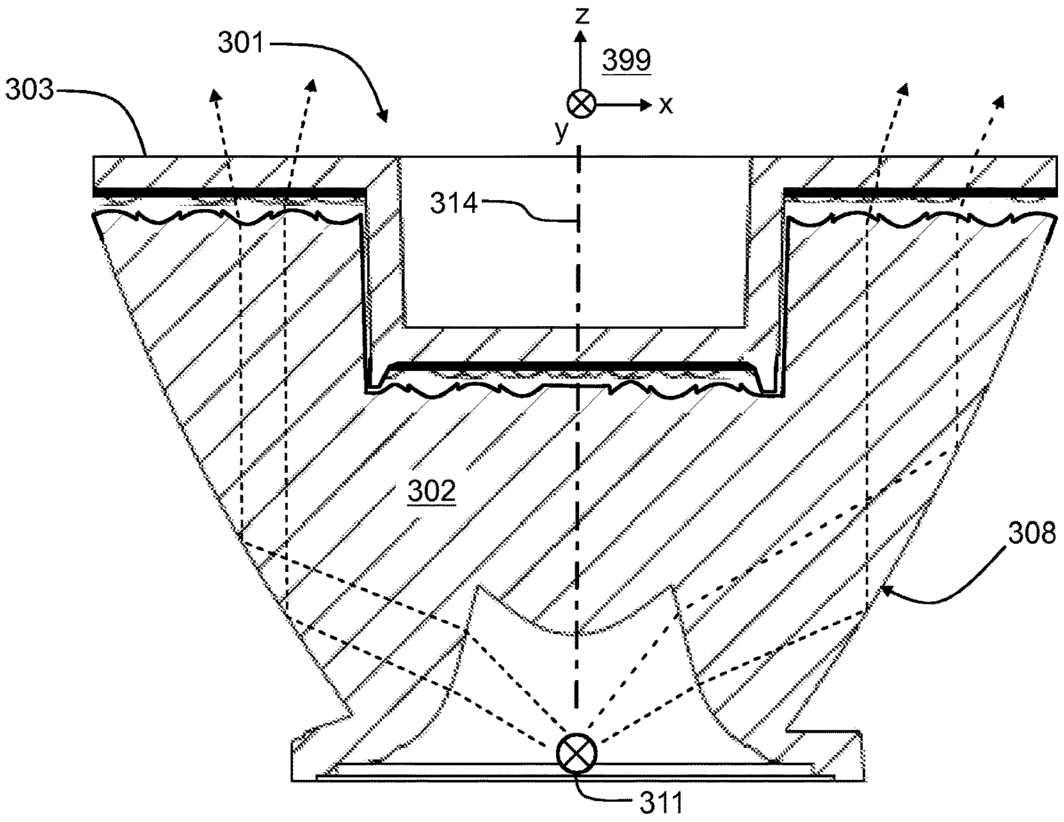
Figure 3C:
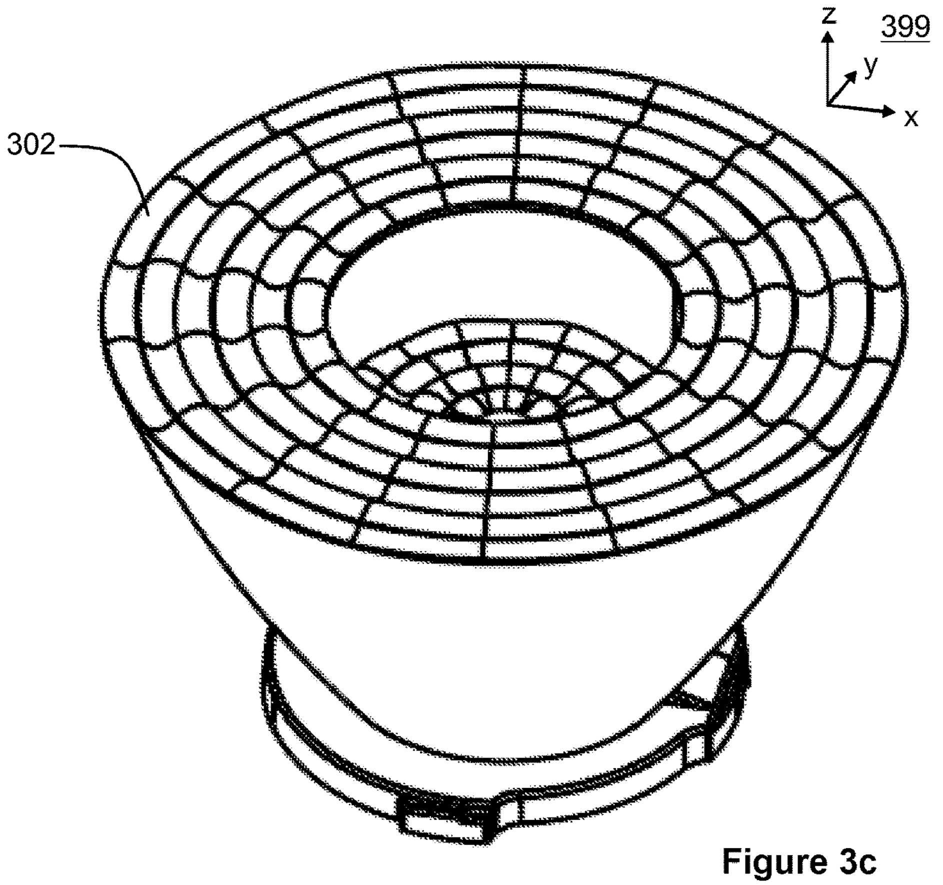
Figure 3D:
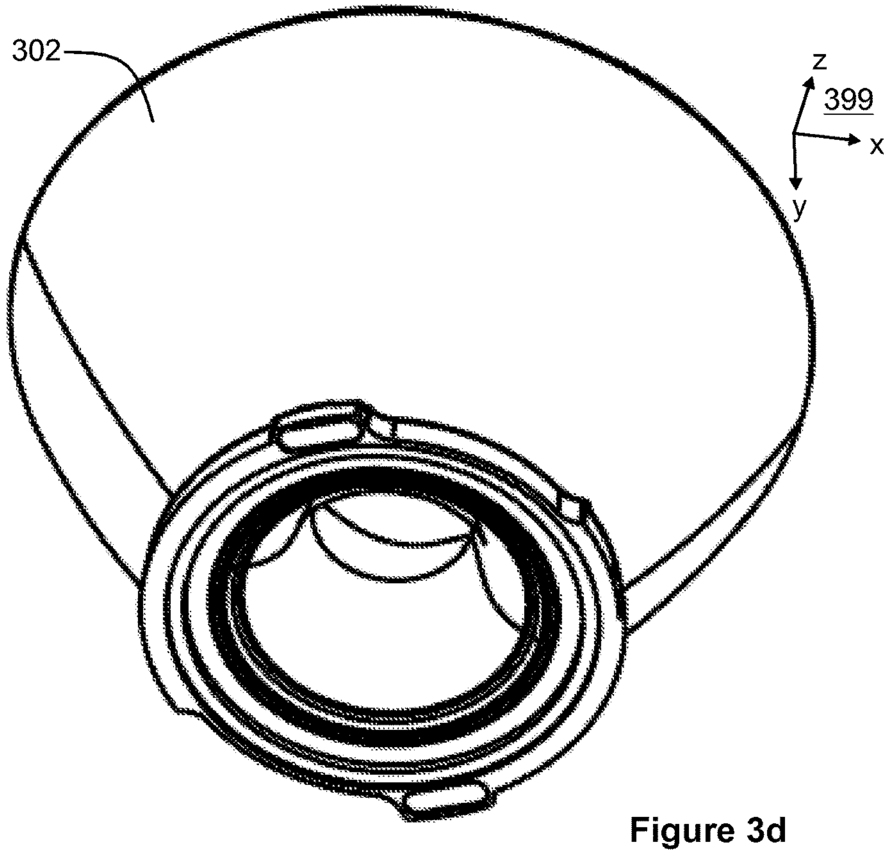
Figure 3E:
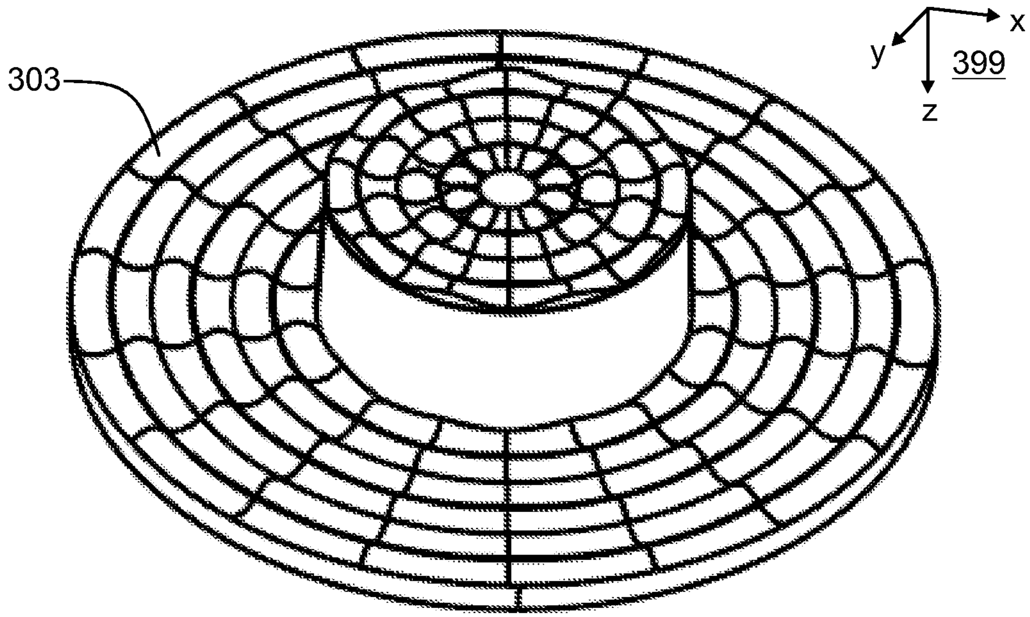
Figure 3F:
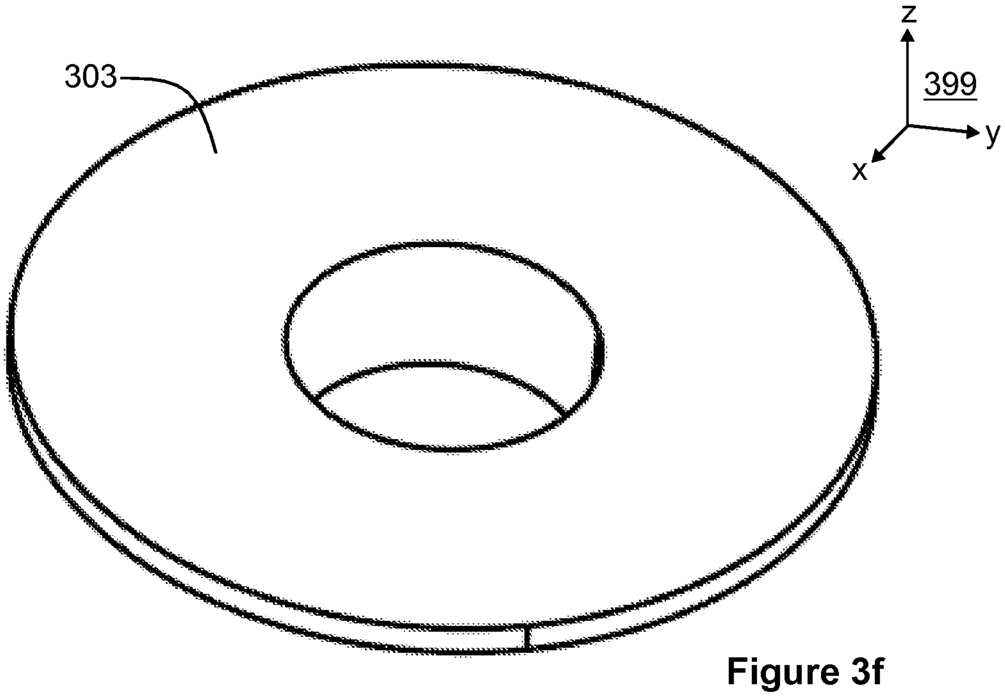

FIGS. 3*a* and 3*b* show section views of an optical device 301 according to an exemplifying and non-limiting embodiment. The geometric section planes are parallel with the xz-plane of a coordinate system 399. The optical device comprises a first optical element 302 that comprises a first surface for modifying a distribution of light exiting the first optical element 302 through the first surface. In this exemplifying optical device 301, the first optical element 302 comprises a reflector surface 308 for reflecting the light to the above-mentioned first surface. The reflector surface 308 is a surface of transparent material for providing total internal reflection "TIR". The reflector surface 308 and surfaces of the first optical element 302 for receiving the light from a point-form light source 311 are shaped so that the reflected light is collimated light. In FIGS. 3*a* and 3*b*, exemplifying light beams are depicted with dashed line arrows. The optical device 301 comprises a second optical element 303 that comprises a second surface facing towards the first surface of the first optical element 302. The second surface is suitable for further modifying the distribution of the light that has exited the first optical element 302. FIGS. 3*c* and 3*d* show isometric views of the first optical element 302, and FIGS. 3*e* and 3*f* show isometric views of the second optical element 303. The viewing directions related to FIGS. 3*c*-3*f* are illustrated with the coordinate system 399. The first and second optical elements 302 and 303 can be manufactured for example with mold casting. The first optical element 302 can be made of for example acrylic plastic, polycarbonate, optical silicone, or glass. Correspondingly, the second optical element 303 can be made of for example acrylic plastic, polycarbonate, optical silicone, or glass.

In this exemplifying optical device 301, the above-mentioned first and second surfaces of the first and second optical elements 302 and 303 comprise convex areas and concave areas. Furthermore, the first and second surfaces comprises stepwise shape discontinuities which reduce a spatial room between the first and second surfaces in at least one position of the second optical element 303 with respect to the first optical element 302. The stepwise shape discontinuities reduce a height difference caused by the convex areas and the concave areas. Therefore, the stepwise shape discontinuities make it possible to keep the first and second optical elements 302 and 303 closer to each other.

As shown in FIG. 3*a*, the concave areas of the second surface of the second optical element 303 compensate at least partly for an optical effect of the convex areas of the first surface of the first optical element 302 and correspondingly the convex areas of the second surface compensate at least partly for an optical effect of the concave areas of the first surface when the second optical element 303 is in a first position with respect to the first optical element 302 so that the concave areas of the second surface are aligned with the convex areas of the first surface. A combined optical effect of the first and second surfaces is changeable by rotating the second optical element 303 with respect to the first optical element 302 around a geometric optical axis 314 of the optical device 301. The geometric optical axis 314 is parallel with the z-axis of the coordinate system 399. FIG. 3*b* shows an exemplifying situation in which the second optical element 303 has been rotated so that the concave areas of the second surface of the second optical element 303 are not aligned with the convex areas of the first surface of the first optical element 302. As illustrated in FIG. 3*b*, the first and second surfaces spread the light penetrating the first and second surfaces.

The first and second optical elements 302 and 303 comprise sliding surfaces 312 and 313 for sliding with respect to each other and for mechanically supporting the first and second optical elements 302 and 303 with respect to each other at least in radial directions perpendicular to the geometric optical axis 314. In this exemplifying optical device 301, the first optical element 302 comprises a cavity that is concentric with the geometric optical axis 314 and the second optical element 303 comprises a projection that is concentric with the geometric optical axis 314 and is in the cavity of the first optical element 302. Walls of the cavity and the projection constitute the sliding surfaces 312 and 313 for supporting the first and second optical elements 302 and 303 with respect to each other. In this exemplifying case, the sliding surfaces 312 and 313 have first portions perpendicular to the radial directions and second portions perpendicular to the geometric optical axis 314. The first portions of the sliding surfaces comprise a cylindrical side surface of the cavity of the first optical element 302 and a cylindrical side surface of the projection of the second optical element 303, and they support the first and second optical elements 302 and 303 with respect to each other in the radial directions. The second portions of the sliding surfaces comprise a part of the bottom of the cavity and a part of an end-surface of the projection, and they support the first and second optical elements 302 and 303 with respect to each other in an axial direction parallel with the geometric optical axis 314. In this exemplifying case, the above-mentioned second portions of the sliding surfaces determine a minimum distance between the first and second surfaces 304 and 305. It is also possible that first and second optical elements of an optical device according to an exemplifying and non-limiting embodiment comprise e.g. conical sliding surfaces.

In the exemplifying optical device 301 illustrated in FIGS. 3*a*-3*f*, the bottom of the cavity of the first optical element 302 constitutes a part of the optically active first surface and correspondingly the end-surface of the projection of the second optical element 303 constitutes a part of the optically active second surface. In this exemplifying case, the projection of the second optical element 302 is hollow as illustrated in FIGS. 3*a* and 3*b*. Therefore, light that propagates in the projection of the second optical element 303 is attenuated less by the transparent material of the second optical element 303 than in a case where a corresponding projection is solid i.e. not hollow. Thus, the construction of the optical device 301 illustrated in FIGS. 3*a*-3*f* is advantageous concerning the mechanical support between the optical elements 302 and 303 as well as optical properties of the optical device 301.

The optical device 301 and the light source 311 shown in FIGS. 3*a* and 3*b* constitute an illumination device according to an exemplifying and non-limiting embodiment. The illumination device further comprises mechanical support structures for supporting the optical device 301 and the light source 311 and for rotatably supporting the second optical element 303 with respect to the first optical element 302. The mechanical support structures are not shown in FIGS. 3*a* and 3*b*.

FIG. 4*a* shows a section view of an illumination device that comprises a light source 411 and an optical device 401 according to an exemplifying and non-limiting embodiment. The geometric section plane is parallel with the xz-plane of a coordinate system 499. The optical device 401 comprises a first optical element 402 and a second optical element 403. The first optical element 402 comprises a first surface for modifying a distribution of light exiting the first optical element 402 through the first surface, and the second optical element 403 comprises a second surface facing towards the first surface and for further modifying the distribution of the light that has exited the first optical element 402. The first and second surfaces comprise convex areas and concave areas. Furthermore, the above-mentioned first and/or second surfaces comprise stepwise shape discontinuities which reduce a spatial room between the first and second surfaces so that the stepwise shape discontinuities make the center areas of the first and second surfaces to be closer to each other as illustrated in FIG. 4*a*.

FIG. 4*a* shows an exemplifying situation where the concave areas of the second surface of the second optical element 403 are aligned with the convex areas of the first surface of the first optical element 404. An optical effect of the optical device 401 is changeable by rotating the second optical element 403 with respect to the first optical element 402 around a geometric optical axis of the optical device 401. The geometric optical axis is parallel with the z-axis of the coordinate system 499. In FIG. 4*a*, the geometric optical axis is depicted with a dash-and-dot line. The exemplifying optical device 401 comprises a frame element 412 for moveably supporting the second optical element 403 with respect to the first optical element 402. In this exemplifying case, the frame element 412 supports the second optical element 403 rotatably with respect to the first optical element 402.

FIG. 4*b* shows a section view of an illumination device that comprises a light source and an optical device according to the prior art.

Figure 5A:
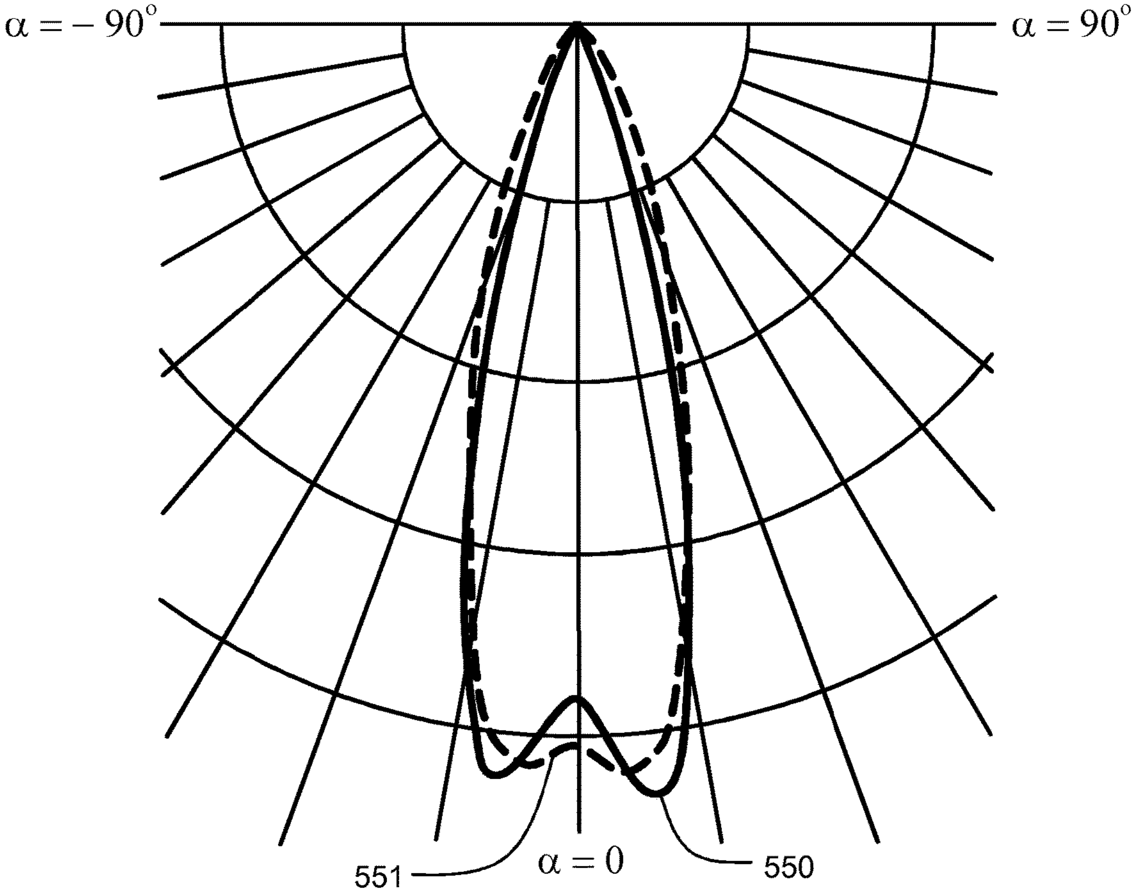
FIGS. 5*a*, 5*b*, 5*c*, 5*d*, 5*e*, 5*f*, 5*g*, and 5*h* illustrate light distribution patterns produced by the illumination devices shown in FIGS. 4*a* and 4*b*.
Figure 5B:
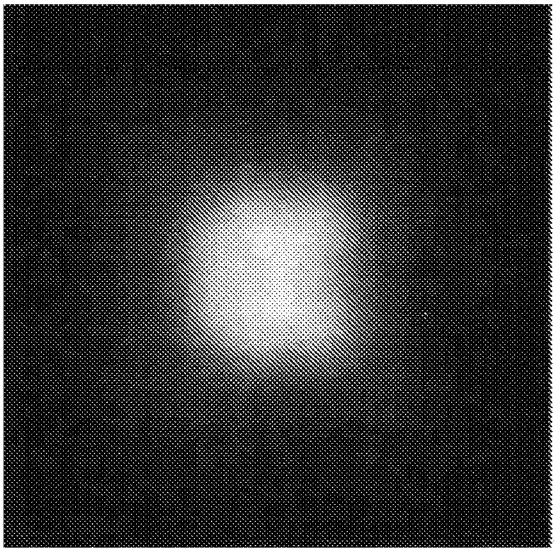
Figure 5C:
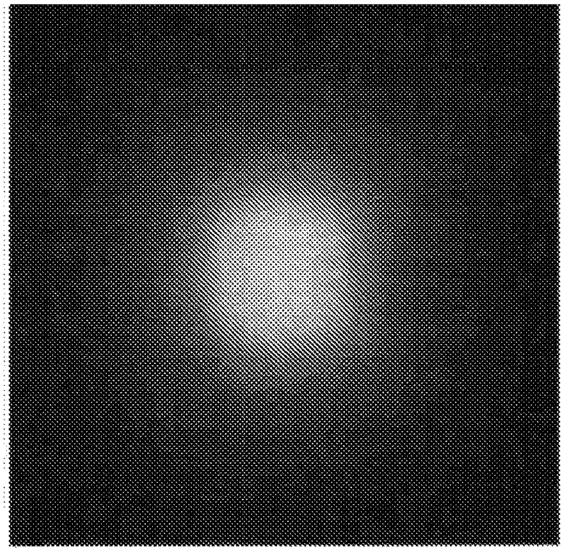

FIG. 5*a* illustrates light distribution patterns produced by the illumination devices shown in FIGS. 4*a* and 4*b*. Each of curves 550 and 551 depicts luminous intensity as a function of an angle α between a viewing direction and the geometric optical axis of the illumination device under consideration. The angle α is shown in FIGS. 4*a* and 4*b*. The luminous intensity depicted with the curve 550 is produced by the illumination device shown in FIG. 4*a* in a situation where the concave areas of the second surface of the second optical element 403 are aligned with the convex areas of the first surface of the first optical element 402. This situation is illustrated in FIG. 5*g*. The luminous intensity depicted with the curve 551 is produced by the illumination device shown in FIG. 4*b* in a situation where the convex and concave areas are aligned with each other. FIG. 5*b* shows a light distribution on a screen perpendicular to the optical axis of the illumination device shown in FIG. 4*a* in a situation where the convex and concave areas are aligned with each other. FIG. 5*c* shows a light distribution on a screen perpendicular to the optical axis of the illumination device shown in FIG. 4*b* in a situation where the convex and concave areas are aligned with each other. As can be seen, the light distribution shown in FIG. 5*b* is more sharp-edged than the light distribution shown in FIG. 5*c*.

Figure 5D:
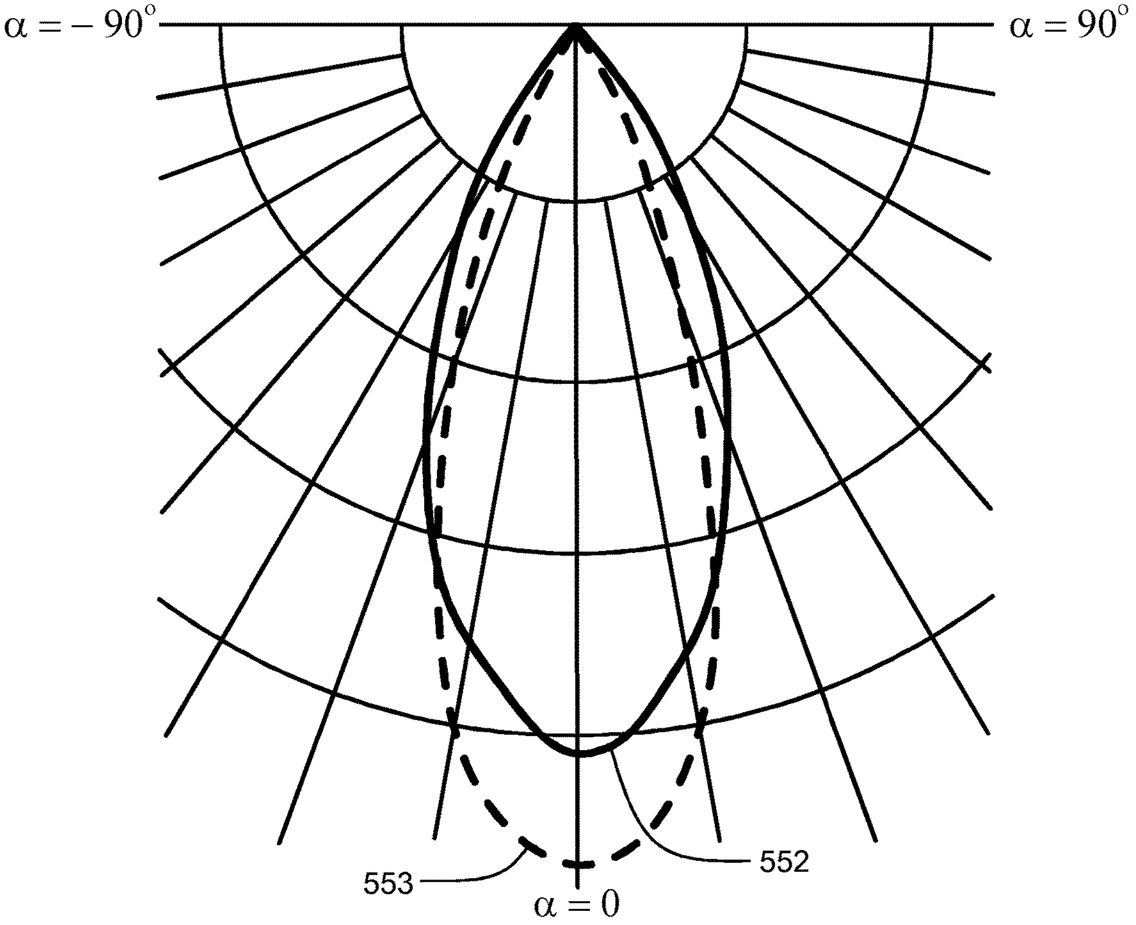
Figure 5E:
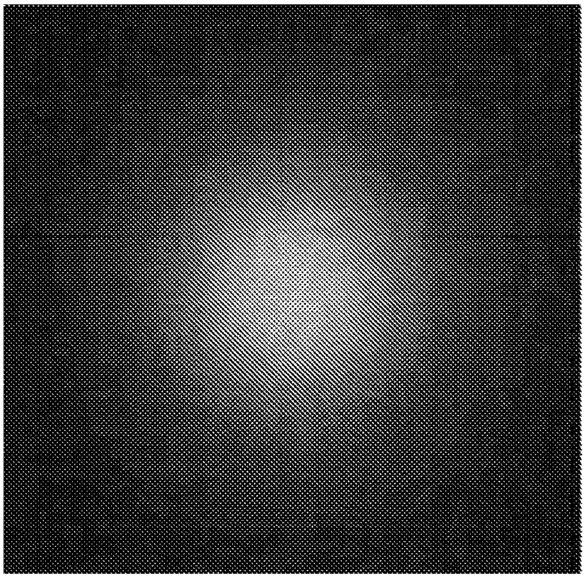
Figure 5F:
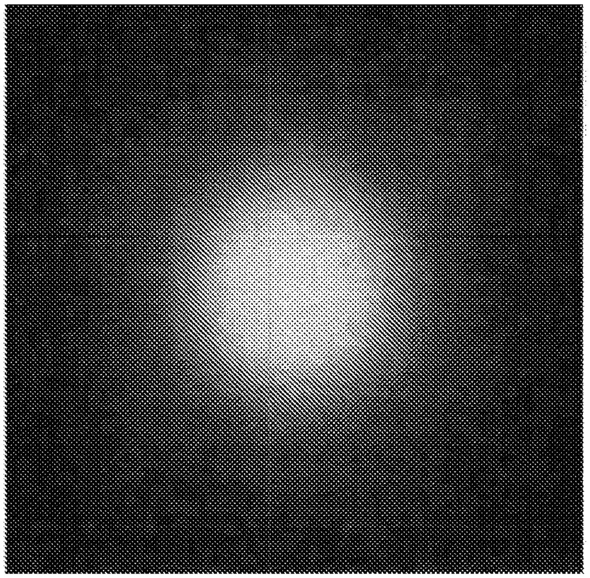
Figure 5G:
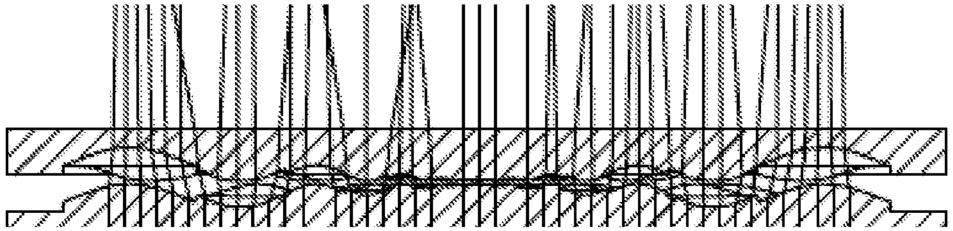
Figure 5H:
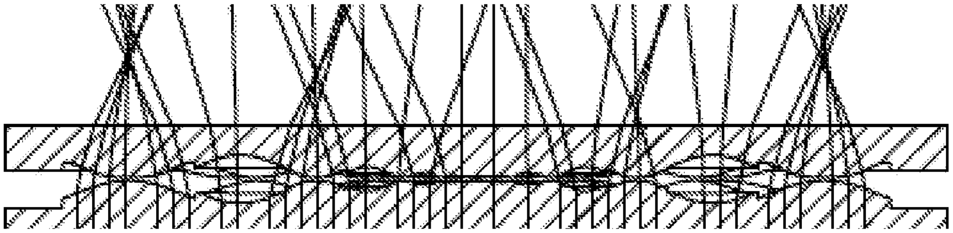

A curve 552 shown in FIG. 5*d* depicts luminous intensity produced by the illumination device shown in FIG. 4*a* in a situation where the second optical element 403 has been rotated around the geometric optical axis so that the convex areas of the second optical element 403 are aligned with the convex areas of the first optical element 403 and correspondingly the concave areas of the second optical element 403 are aligned with the concave areas of the first optical element 403. This situation is illustrated in FIG. 5*h*. A curve 553 shows corresponding luminous intensity produced by the illumination device shown in FIG. 4*b* in a situation of the kind described above. FIG. 5*e* shows a light distribution on a screen perpendicular to the optical axis of the illumination device shown in FIG. 4*a* in the above-described situation. FIG. 5*f* shows a light distribution on a screen perpendicular to the optical axis of the illumination device shown in FIG. 4*b* in the above-described situation. As shown by FIGS. 5*a*-5*f*, the above-described rotation of the second optical element causes a greater effect on the light distribution pattern produced by the illumination device shown in FIG. 4*a* than on the light distribution pattern produced by the illumination device shown in FIG. 4*b*.

Figure 6:
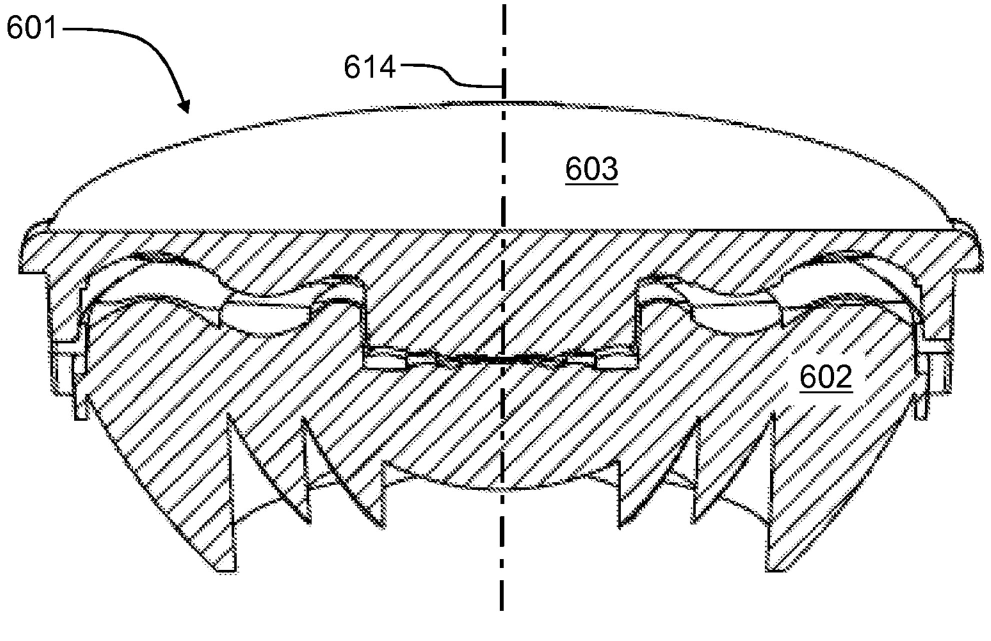
FIG. 6 illustrates an optical device according to an exemplifying and non-limiting embodiment.

FIG. 6 shows a section view of an optical device 601 according to an exemplifying and non-limiting embodiment. The optical device comprises a first optical element 602 and a second optical element 603. The first optical element 602 comprises a first surface for modifying a distribution of light exiting the first optical element 602 through the first surface, and the second optical element 603 comprises a second surface facing towards the first surface and for further modifying the distribution of the light that has exited the first optical element 602. The first and second surfaces comprise convex areas and concave areas. In this exemplifying optical device, the first optical element 602 comprises a cavity that is concentric with a geometric optical axis 614 and the second optical element 603 comprises a projection that is concentric with the geometric optical axis 614 and is in the cavity of the first optical element. The second optical element 603 is rotatable with respect to the first optical element 602 around the geometric optical axis 614 of the optical device 601. As illustrated in FIG. 6, the side walls of the projection and the cavity represent stepwise shape discontinuities configured to reduce a spatial room between the first and second surfaces so that the projection and the cavity reduce a distance between the center areas of the first and second surfaces.

The specific examples provided in the description given above should not be construed as limiting the scope and/or the applicability of the appended claims. Lists and groups of examples provided in the description given above are not exhaustive unless otherwise explicitly stated.

What is claimed is:

1. An optical device for modifying light distribution, the optical device comprising:

a first optical element comprising a first surface for modifying a distribution of light exiting the first optical element through the first surface, and a second optical element comprising a second surface facing towards the first surface in a first direction and for further modifying the distribution of the light entering the second optical element through the second surface, wherein the second optical element is moveably supported with respect to the first optical element so that the second surface is movable with respect to the first surface in a direction parallel with the first surface, and that one of the first and second surfaces comprises convex areas and another one of the first and second surfaces comprises concave areas for at least partly compensating for an optical effect of the convex areas when the second optical element is in a first position with respect to the first optical element so that the convex areas and the concave areas are aligned with respect to each other, wherein a combined optical effect of the first and second surfaces is changeable by moving the second optical element from the first position towards a second position in which the concave areas and the convex areas are non-aligned with respect to each other, and wherein at least one of the first and second surfaces is shaped to have stepwise shape discontinuities configured to reduce a spatial room between the first and second surfaces in at least one position of the second optical element with respect to the first optical element.

2. The optical device according to claim 1, wherein the stepwise shape discontinuities are configured to reduce the spatial room when the second optical element is in the first position with respect to the first optical element so that the stepwise shape discontinuities are configured to reduce a distance from at least one of the convex areas to one of the concave areas that is aligned with the at least one of the convex areas.

3. The optical device according to claim 2, wherein the stepwise shape discontinuities are configured to adapt a minimum of a distance from a top of each convex area to one of the first and second surfaces facing towards the convex area under consideration to be a same for each of the convex areas on a movement range of the second surface with respect to the first surface.

4. The optical device according to claim 3, wherein the first optical element comprises a reflector surface for reflecting the light to the first surface.

5. The optical device according to claim 4, wherein the reflector surface and a surface of the first optical element for receiving the light from a point-form light source are shaped so that the reflected light is collimated light.

6. The optical device according to claim 2, wherein the first optical element comprises a reflector surface for reflecting the light to the first surface.

7. The optical device according to claim 6, wherein the reflector surface and a surface of the first optical element for receiving the light from a point-form light source are shaped so that the reflected light is collimated light.

8. The optical device according to claim 1, wherein the first surface comprises the convex areas, the second surface comprises the concave areas, the first surface comprises other concave areas between the convex areas of the first surface, the second surface comprises other convex areas between the concave areas of the second surface, the first surface comprises first ones of the stepwise shape discontinuities between the convex areas and the concave areas of the first surface, and the second surface comprises second ones of the stepwise shape discontinuities between the concave areas and the convex areas of the second surface.

9. The optical device according to claim 8, wherein the first optical element comprises a reflector surface for reflecting the light to the first surface.

10. The optical device according to claim 1, wherein the first optical element comprises a reflector surface for reflecting the light to the first surface.

11. The optical device according to claim 10, wherein the reflector surface and a surface of the first optical element for receiving the light from a point-form light source are shaped so that the reflected light is collimated light.

12. The optical device according to claim 10, wherein the reflector surface is a surface of transparent material for providing total internal reflection.

13. The optical device according to claim 1, wherein the second optical element is rotatable with respect to the first optical element around a geometric optical axis of the optical device.

14. The optical device according to claim 13, wherein the first optical element comprises a cavity concentric with the geometric optical axis and the second optical element comprises a projection concentric with the geometric optical axis and being in the cavity of the first optical element.

15. The optical device according to claim 14, wherein a bottom of the cavity of the first optical element constitutes a part of the first surface of the first optical element and an end-surface of the projection of the second optical element facing towards the bottom of the cavity constitutes a part of the second surface of the second optical element, and side walls of the projection and the cavity represent the stepwise shape discontinuities.

16. The optical device according to claim 1, wherein the first optical element is made of one of the following: acrylic plastic, polycarbonate, optical silicone, glass.

17. The optical device according to claim 1, wherein the second optical element is made of one of the following: acrylic plastic, polycarbonate, optical silicone, glass.

18. The optical device according to claim 1, wherein the optical device comprises a frame element for moveably supporting the second optical element with respect to the first optical element.

19. A set of molds comprising:

a first mold having a form suitable for manufacturing, by mold casting, a first piece of transparent material constituting a first optical element of an optical device, and a second mold having a form suitable for manufacturing, by mold casting, a second piece of transparent material constituting a second optical element of the optical device, the optical device comprising:

a first optical element comprising a first surface for modifying a distribution of light exiting the first optical element through the first surface, and a second optical element comprising a second surface facing towards the first surface in a first direction and for further modifying the distribution of the light entering the second optical element through the second surface, wherein the second optical element is moveably supported with respect to the first optical element so that the second surface is movable with respect to the first surface in a direction parallel with the first surface, and that one of the first and second surfaces comprises convex areas and another one of the first and second surfaces comprises concave areas for at least partly compensating for an optical effect of the convex areas when the second optical element is in a first position with respect to the first optical element so that the convex areas and the concave areas are aligned with respect to each other, wherein a combined optical effect of the first and second surfaces is changeable by moving the second optical element from the first position towards a second position in which the concave areas and the convex areas are non-aligned with respect to each other, and wherein at least one of the first and second surfaces is shaped to have stepwise shape discontinuities configured to reduce a spatial room between the first and second surfaces in at least one position of the second optical element with respect to the first optical element.

20. An illumination device comprising:

a light source, and an optical device for modifying a distribution of light emitted by the light source, the optical device comprising:

a first optical element comprising a first surface for modifying a distribution of light exiting the first optical element through the first surface, and a second optical element comprising a second surface facing towards the first surface in a first direction and for further modifying the distribution of the light entering the second optical element through the second surface, wherein the second optical element is moveably supported with respect to the first optical element so that the second surface is movable with respect to the first surface in a direction parallel with the first surface, and that one of the first and second surfaces comprises convex areas and another one of the first and second surfaces comprises concave areas for at least partly compensating for an optical effect of the convex areas when the second optical element is in a first position with respect to the first optical element so that the convex areas and the concave areas are aligned with respect to each other, wherein a combined optical effect of the first and second surfaces is changeable by moving the second optical element from the first position towards a second position in which the concave areas and the convex areas are non-aligned with respect to each other, and wherein at least one of the first and second surfaces is shaped to have stepwise shape discontinuities configured to reduce a spatial room between the first and second surfaces in at least one position of the second optical element with respect to the first optical element.

* * * * *